(12) United States Patent
Men et al.

(10) Patent No.: US 11,634,223 B2
(45) Date of Patent: Apr. 25, 2023

(54) UNMANNED AERIAL VEHICLE CONTROL METHOD, UNMANNED AERIAL VEHICLE CONTROL DEVICE, AND COMPUTER READABLE STORAGE MEDIUM

(71) Applicants: BEIJING JINGDONG SHANGKE INFORMATION TECHNOLOGY CO., LTD., Beijing (CN); BEIJING JINGDONG CENTURY TRADING CO., LTD., Beijing (CN)

(72) Inventors: Chunlei Men, Beijing (CN); Yongwei Zhang, Beijing (CN)

(73) Assignee: BEIJING JINGDONG QIANSHI TECHNOLOGY CO., LTD., Beijing (CN)

( * ) Notice: Subject to any disclaimer, the term of this patent is extended or adjusted under 35 U.S.C. 154(b) by 385 days.

(21) Appl. No.: 16/764,708

(22) PCT Filed: Sep. 26, 2018

(86) PCT No.: PCT/CN2018/107509
§ 371 (c)(1),
(2) Date: May 15, 2020

(87) PCT Pub. No.: WO2019/100846
PCT Pub. Date: May 31, 2019

(65) Prior Publication Data
US 2021/0171193 A1 Jun. 10, 2021

(30) Foreign Application Priority Data
Nov. 27, 2017 (CN) .......................... 201711205125.8

(51) Int. Cl.
*B64C 39/02* (2023.01)
*G05D 1/10* (2006.01)
(Continued)

(52) U.S. Cl.
CPC ........... *B64C 39/024* (2013.01); *G05D 1/102* (2013.01); *G05D 3/20* (2013.01); *B64U 2101/30* (2023.01); *B64U 2201/104* (2023.01)

(58) Field of Classification Search
None
See application file for complete search history.

(56) References Cited

U.S. PATENT DOCUMENTS

| 8,682,504 B2 | 3/2014 | Vos et al. | |
| 2010/0183192 A1* | 7/2010 | Fritsch | G06T 7/254 |
| | | | 701/469 |

(Continued)

FOREIGN PATENT DOCUMENTS

| CN | 103226356 A | 7/2013 |
| CN | 104049641 A | 9/2014 |

(Continued)

OTHER PUBLICATIONS

International Search Report dated Dec. 28, 2018 in PCT/CN2018/107509 filed on Sep. 26, 2018, 3 pages.

(Continued)

*Primary Examiner* — Jelani A Smith
*Assistant Examiner* — Davin Seol
(74) *Attorney, Agent, or Firm* — Oblon, McClelland, Maier & Neustadt, L.L.P.

(57) ABSTRACT

The present disclosure provides a control method of a UAV, a control device of a UAV, and a computer-readable storage medium, and relates to the technical field of UAVs. The control method of a UAV includes: determining a deviation between a vertical mapping point on the ground and a landing point of the UAV, the deviation comprising a deviation in a horizontal axis direction of a camera coordinate system and a deviation in a vertical axis direction of the camera coordinate system; and generating speed control amounts of the UAV in the horizontal axis direction and the vertical axis direction of the camera coordinate system by a controller, using the deviation in the horizontal axis direction and the deviation in the vertical axis direction.

15 Claims, 5 Drawing Sheets

(51) Int. Cl.
    *G05D 3/20*        (2006.01)
    *B64U 101/30*      (2023.01)

(56) References Cited

U.S. PATENT DOCUMENTS

| | | | |
|---|---|---|---|
| 2013/0325215 A1 | 12/2013 | Vos et al. | |
| 2019/0011921 A1* | 1/2019 | Wang | G06T 7/246 |
| 2020/0126249 A1* | 4/2020 | Tang | G06T 7/579 |
| 2022/0091618 A1* | 3/2022 | Li | G05D 1/0676 |

FOREIGN PATENT DOCUMENTS

| | | |
|---|---|---|
| CN | 105867397 A | 8/2016 |
| CN | 106774386 A | 5/2017 |
| CN | 106774423 A | 5/2017 |
| CN | 107065924 A | 8/2017 |

OTHER PUBLICATIONS

The First Office Action in Chinese Patent Application No. 20171 1205125.8 filed on Nov. 27, 2017 (with English translation), 15 pages.

* cited by examiner

UNMANNED AERIAL VEHICLE CONTROL METHOD, UNMANNED AERIAL VEHICLE CONTROL DEVICE, AND COMPUTER READABLE STORAGE MEDIUM

CROSS-REFERENCE TO RELATED APPLICATIONS

The present disclosure is based on and claims priority of Chinese application for invention 201711205125.8, filed on Nov. 27, 2017, the disclosure of which is hereby incorporated into this disclosure by reference in its entirety.

TECHNICAL FIELD

The present disclosure relates to the technical field of UAVs (Unmanned Aerial Vehicle), and in particular, to a control method of a UAV, a control device of a UAV, and a computer-readable storage medium.

BACKGROUND

Many technical methods are adopted in the autonomous landing process of UAVs, typically including GPS/INS (Inertial Navigation System) integrated navigation, wireless positioning technology, position-based visual servo control, and so on.

The position-based visual servo control method uses a specially designed Quick Response (QR) code-type cooperative label and a corresponding tag recognition algorithm. By locating a corner position of the QR code tag, a spatial position and attitude of the UAV's on-board camera relative to the cooperative label is determined. Based on the determined relative position and attitude information, an appropriate control law is selected to generate a flight control amount and guide the UAV to complete the autonomous landing process.

SUMMARY

According to an aspect of the embodiment of the present disclosure, a control method of a UAV is provided, comprising: determining a deviation between a vertical mapping point on the ground and a landing point of the UAV comprises: determining a deviation between the vertical mapping point and the landing point in the horizontal axis direction of the camera coordinate system and a deviation between the vertical mapping point and the landing point in the vertical axis direction of the camera coordinate system by using a vertical height of the UAV relative to the ground, coordinates of the landing point in a pixel coordinate system, an origin of an image coordinate system in the pixel coordinate system, and normalized focal lengths of the UAV camera in the horizontal axis and the vertical axis direction of the pixel coordinate system; and generating speed control amounts of the UAV in the horizontal axis direction and the vertical axis direction of the camera coordinate system by a controller, using the deviation in the horizontal axis direction and the deviation in the vertical axis direction.

In some embodiments, determining a deviation between the vertical mapping point and the landing point in the horizontal axis direction of the camera coordinate system and a deviation between the vertical mapping point and the landing point in the vertical axis direction of the camera coordinate system comprises: determining a correspondence between coordinates in the pixel coordinate system and coordinates in the image coordinate system; determining a correspondence between coordinates in the image coordinate system and coordinates in the camera coordinate system according to the imaging principle of the camera; and determining a correspondence between coordinates in the pixel coordinate system and coordinates in the camera coordinate system, and determining a deviation between the vertical mapping point and the landing point in the horizontal axis direction of the camera coordinate system and a deviation between the vertical mapping point and the landing point in the vertical axis direction of the camera coordinate system using this correspondence.

In some embodiments, a deviation between the vertical mapping point and the landing point in the horizontal axis direction of the camera coordinate system and a deviation between the vertical mapping point and the landing point in the vertical axis direction of the camera coordinate system are determined using the following formula:

$$\begin{cases} x = z(u-u_0)/\alpha_x \\ y = z(v-v_0)/\alpha_y \end{cases}$$

where x represents a deviation between the vertical mapping point and the landing point in the horizontal axis direction of the camera coordinate system, y represents a deviation between the vertical mapping point and the landing point in the vertical axis direction of the camera coordinate system, and z represents a vertical height of the UAV relative to the ground, u represents an abscissa of the landing point in the pixel coordinate system, v represents an ordinate of the landing point in the pixel coordinate system, $u_0$ represents an abscissa of the origin of the image coordinate system in the pixel coordinate system, and $v_0$ represents an ordinate of the origin of the image coordinate system in the pixel coordinate system, $\alpha_x$ represents a normalized focal length of the UAV camera in the horizontal axis direction of the pixel coordinate system, and $\alpha_y$ represents a normalized focal length of the UAV camera in the vertical axis coordinate of the pixel coordinate system.

In some embodiments, the normalized focal length of the UAV camera in the horizontal axis direction of the pixel coordinate system is determined using a ratio of the focal length of the UAV camera to a size of each pixel in the horizontal axis direction; the normalized focal length of the UAV camera in the vertical axis direction of the pixel coordinate system is determined using a ratio of the focal length of the UAV camera to a size of each pixel in the vertical axis direction.

In some embodiments, the controller is a proportional-integral-differential (PID) controller, the PID controller generating a speed control amount of the UAV in the horizontal axis direction of the camera coordinate system and a speed control amount of the UAV in the vertical axis direction of the camera coordinate system using the following formula:

$$\begin{cases} U_x(t) = P_x x(t) + I_x[x(t) + \ldots + x(0)] + D_x[x(t) - x(t-1)] \\ U_y(t) = P_y y(t) + I_y[y(t) + \ldots + y(0)] + D_y[y(t) - y(t-1)] \end{cases}$$

where $u_x(t)$ represents a speed control amount of the UAV in the horizontal axis direction of the camera coordinate system at time t, $u_y(t)$ represents a speed control amount of the UAV in the vertical axis direction of the camera coordinate system at time t, $P_x$ represents a proportional control parameter of the PID controller in the horizontal axis direction of the camera coordinate system, $P_y$ represents a proportional control parameter of the PID controller in the vertical axis direction of the camera coordinate system, $I_x$ represents a differential control parameter of the PID controller in the horizontal axis direction of the camera coordinate system, $I_y$ represents a differential control parameter of the PID controller in the vertical axis direction of the camera coordinate system $D_x$ represents an integral control parameter of the PID controller in the horizontal axis direction of the camera coordinate system, and $D_y$ represents an integral control parameter of the PID controller in the vertical axis direction of the camera coordinate system, x(t) represents the deviation in the horizontal axis direction at time t, and y(t) represents the deviation in the vertical axis direction at time t.

According to another aspect of the embodiments of the present disclosure, a control device of a UAV is provided, comprising: a processer; and a memory coupled to the processor and storing instructions that when executed by the processor, cause the processor to: determine a deviation between the vertical mapping point and the landing point in the horizontal axis direction of the camera coordinate system and a deviation between the vertical mapping point and the landing point in the vertical axis direction of the camera coordinate system by using a vertical height of the UAV relative to the ground, coordinates of the landing point in a pixel coordinate system, an origin of an image coordinate system in the pixel coordinate system, and normalized focal lengths of the UAV camera in the horizontal axis and the vertical axis direction of the pixel coordinate system; and generate speed control amounts of the UAV in the horizontal axis direction and the vertical axis direction of the camera coordinate system by a controller, using the deviation in the horizontal axis direction and the deviation in the vertical axis direction.

In some embodiments, determining a deviation between the vertical mapping point and the landing point in the horizontal axis direction of the camera coordinate system and a deviation between the vertical mapping point and the landing point in the vertical axis direction of the camera coordinate system comprises: determining a correspondence between coordinates in the pixel coordinate system and coordinates in the image coordinate system; determining a correspondence between coordinates in the image coordinate system and coordinates in the camera coordinate system according to the imaging principle of the camera; and determining a correspondence between coordinates in the pixel coordinate system and coordinates in the camera coordinate system, and determining a deviation between the vertical mapping point and the landing point in the horizontal axis direction of the camera coordinate system and a deviation between the vertical mapping point and the landing point in the vertical axis direction of the camera coordinate system using this correspondence.

In some embodiments, a deviation between the vertical mapping point and the landing point in the horizontal axis direction of the camera coordinate system and a deviation between the vertical mapping point and the landing point in the vertical axis direction of the camera coordinate system are determined using the following formula:

$$\begin{cases} x = z(u - u_0)/\alpha_x \\ y = z(v - v_0)/\alpha_y \end{cases}$$

where x represents a deviation between the vertical mapping point and the landing point in the horizontal axis direction of the camera coordinate system, y represents a deviation between the vertical mapping point and the landing point in the vertical axis direction of the camera coordinate system, and z represents a vertical height of the UAV relative to the ground, u represents an abscissa of the landing point in the pixel coordinate system, v represents an ordinate of the landing point in the pixel coordinate system, $u_0$ represents an abscissa of the origin of the image coordinate system in the pixel coordinate system, and $v_0$ represents an ordinate of the origin of the image coordinate system in the pixel coordinate system, $\alpha_x$ represents a normalized focal length of the UAV camera in the horizontal axis direction of the pixel coordinate system, and $\alpha_y$ represents a normalized focal length of the UAV camera in the vertical axis coordinate of the pixel coordinate system.

In some embodiments, the normalized focal length of the UAV camera in the horizontal axis direction of the pixel coordinate system is determined using a ratio of the focal length of the UAV camera to a size of each pixel in the horizontal axis direction; the normalized focal length of the UAV camera in the vertical axis direction of the pixel coordinate system is determined using a ratio of the focal length of the UAV camera to a size of each pixel in the vertical axis direction.

In some embodiments, the controller is a proportional-integral-differential (PID) controller, the PID controller generating a speed control amount of the UAV in the horizontal axis direction of the camera coordinate system and a speed control amount of the UAV in the vertical axis direction of the camera coordinate system using the following formula:

$$\begin{cases} U_x(t) = P_x x(t) + I_x[x(t) + \ldots + x(0)] + D_x[x(t) - x(t-1)] \\ U_y(t) = P_y y(t) + I_y[y(t) + \ldots + y(0)] + D_y[y(t) - y(t-1)] \end{cases}$$

where $u_x(t)$ represents a speed control amount of the UAV in the horizontal axis direction of the camera coordinate system at time t, $u_y(t)$ represents a speed control amount of the UAV in the vertical axis direction of the camera coordinate system at time t, $P_x$ represents a proportional control parameter of the PID controller in the horizontal axis direction of the camera coordinate system, $P_y$ represents a proportional control parameter of the PID controller in the vertical axis direction of the camera coordinate system, $I_x$ represents a differential control parameter of the PID controller in the horizontal axis direction of the camera coordinate system, $I_y$ represents a differential control parameter of the PID controller in the vertical axis direction of the camera coordinate system $D_x$ represents an integral control parameter of the PID controller in the horizontal axis direction of the camera coordinate system, and $D_y$ represents an integral control parameter of the PID controller in the vertical axis direction of the camera coordinate system, x(t) represents the deviation in the horizontal axis direction at time t, and y(t) represents the deviation in the vertical axis direction at time t.

According to a further aspect of the embodiments of the present disclosure, there is provided a non-transitory computer-readable storage medium storing computer instructions which, when executed by a processor, cause a processor to: determine a deviation between the vertical mapping point and the landing point in the horizontal axis direction of the camera coordinate system and a deviation between the vertical mapping point and the landing point in the vertical axis direction of the camera coordinate system by using a vertical height of the UAV relative to the ground, coordinates of the landing point in a pixel coordinate system, an origin of an image coordinate system in the pixel coordinate system, and normalized focal lengths of the UAV camera in the horizontal axis and the vertical axis direction of the pixel coordinate system; and generate speed control amounts of the UAV in the horizontal axis direction and the vertical axis direction of the camera coordinate system by a controller, using the deviation in the horizontal axis direction and the deviation in the vertical axis direction.

In some embodiments, determining a deviation between the vertical mapping point and the landing point in the horizontal axis direction of the camera coordinate system and a deviation between the vertical mapping point and the landing point in the vertical axis direction of the camera coordinate system comprises: determining a correspondence between coordinates in the pixel coordinate system and coordinates in the image coordinate system; determining a correspondence between coordinates in the image coordinate system and coordinates in the camera coordinate system according to the imaging principle of the camera; and determining a correspondence between coordinates in the pixel coordinate system and coordinates in the camera coordinate system, and determining a deviation between the vertical mapping point and the landing point in the horizontal axis direction of the camera coordinate system and a deviation between the vertical mapping point and the landing point in the vertical axis direction of the camera coordinate system using this correspondence.

In some embodiments, a deviation between the vertical mapping point and the landing point in the horizontal axis direction of the camera coordinate system and a deviation between the vertical mapping point and the landing point in the vertical axis direction of the camera coordinate system are determined using the following formula:

$$\begin{cases} x = z(u - u_0)/\alpha_x \\ y = z(v - v_0)/\alpha_y \end{cases}$$

where x represents a deviation between the vertical mapping point and the landing point in the horizontal axis direction of the camera coordinate system, y represents a deviation between the vertical mapping point and the landing point in the vertical axis direction of the camera coordinate system, and z represents a vertical height of the UAV relative to the ground, u represents an abscissa of the landing point in the pixel coordinate system, v represents an ordinate of the landing point in the pixel coordinate system, $u_0$ represents an abscissa of the origin of the image coordinate system in the pixel coordinate system, and $v_0$ represents an ordinate of the origin of the image coordinate system in the pixel coordinate system, $\alpha_x$ represents a normalized focal length of the UAV camera in the horizontal axis direction of the pixel coordinate system, and $\alpha_y$ represents a normalized focal length of the UAV camera in the vertical axis coordinate of the pixel coordinate system.

In some embodiments, the normalized focal length of the UAV camera in the horizontal axis direction of the pixel coordinate system is determined using a ratio of the focal length of the UAV camera to a size of each pixel in the horizontal axis direction; the normalized focal length of the UAV camera in the vertical axis direction of the pixel coordinate system is determined using a ratio of the focal length of the UAV camera to a size of each pixel in the vertical axis direction.

In some embodiments, the controller is a proportional-integral-differential (PID) controller, the PID controller generating a speed control amount of the UAV in the horizontal axis direction of the camera coordinate system and a speed control amount of the UAV in the vertical axis direction of the camera coordinate system using the following formula:

$$\begin{cases} U_x(t) = P_x x(t) + I_x[x(t) + \ldots + x(0)] + D_x[x(t) - x(t-1)] \\ U_y(t) = P_y y(t) + I_y[y(t) + \ldots + y(0)] + D_y[y(t) - y(t-1)] \end{cases}$$

where $u_x(t)$ represents a speed control amount of the UAV in the horizontal axis direction of the camera coordinate system at time t, $u_y(t)$ represents a speed control amount of the UAV in the vertical axis direction of the camera coordinate system at time t, $P_x$ represents a proportional control parameter of the PID controller in the horizontal axis direction of the camera coordinate system, $P_y$ represents a proportional control parameter of the PID controller in the vertical axis direction of the camera coordinate system, $I_x$ represents a differential control parameter of the PID controller in the horizontal axis direction of the camera coordinate system, $I_y$ represents a differential control parameter of the PID controller in the vertical axis direction of the camera coordinate system $D_x$ represents an integral control parameter of the PID controller in the horizontal axis direction of the camera coordinate system, and $D_y$ represents an integral control parameter of the PID controller in the vertical axis direction of the camera coordinate system, x(t) represents the deviation in the horizontal axis direction at time t, and y(t) represents the deviation in the vertical axis direction at time t.

Other features and advantages of the present disclosure will become clear from the following detailed description of exemplary embodiments of the present disclosure with reference to the accompanying drawings.

BRIEF DESCRIPTION OF THE DRAWINGS

The drawings described herein are used to provide a further understanding of the present disclosure and constitute a part of the present application. The illustrative embodiments of the present disclosure as well as the descriptions are used for explaining the present disclosure, and do not constitute improper definitions on the present disclosure. In the accompanying drawings.

DETAILED DESCRIPTION

Next, the technical solution in the embodiments of the present disclosure will be explicitly and completely described in combination with the drawings in the embodiments of the present disclosure. Apparently, the described embodiments are merely part of the embodiments of the present disclosure, rather than all the embodiments. The following descriptions of at least one exemplary embodiment which are in fact merely descriptive, by no means serve as any delimitation on the present disclosure as well as its application or use. On the basis of the embodiments of the present disclosure, all the other embodiments acquired by a person skilled in the art on the premise that no inventive effort is involved fall into the scope protected by the present disclosure.

Unless additionally specified, the relative arrangements, numerical expressions and numerical values of the components and steps expounded in these examples do not limit the scope of the present invention. At the same time, it should be understood that, in order to facilitate the description, the dimensions of various parts shown in the drawings are not drown according to actual proportional relations. The techniques, methods, and apparatuses known to a common technical person in the relevant art may not be discussed in detail, but where appropriate, techniques, methods, and apparatuses should be considered as part of the granted description. Among all the examples shown and discussed here, any specific value should be construed as being merely illustrative, rather than as a delimitation. Thus, other examples of exemplary embodiments may have different values. It should be noted that similar reference signs and letters present similar items in the following drawings, and therefore, once an item is defined in a drawing, there is no need for further discussion in the subsequent drawings.

A technical problem to be solved by the present disclosure is how to provide a simpler and more efficient control method of a UAV.

The inventor has found that the position-based visual servo control method requires a complete QR-code cooperative label encoding system and a corresponding recognition algorithm. The cooperative label encoding and recognition process, which is relatively complicated, takes a long time for calculation and has poor real-time performance. In addition, its robustness to abnormal situations such as tag occlusion is poor, and it is easy to fail to recognize the cooperative label, resulting in positioning failure.

The control method of a UAV provided by the present disclosure is based on the technology of image visual servo control, and directly calculates a flight control amount based on a position deviation in an image to complete the UAV control process, so that simple and efficient UAV autonomous landing can be achieved.

Figure 1:
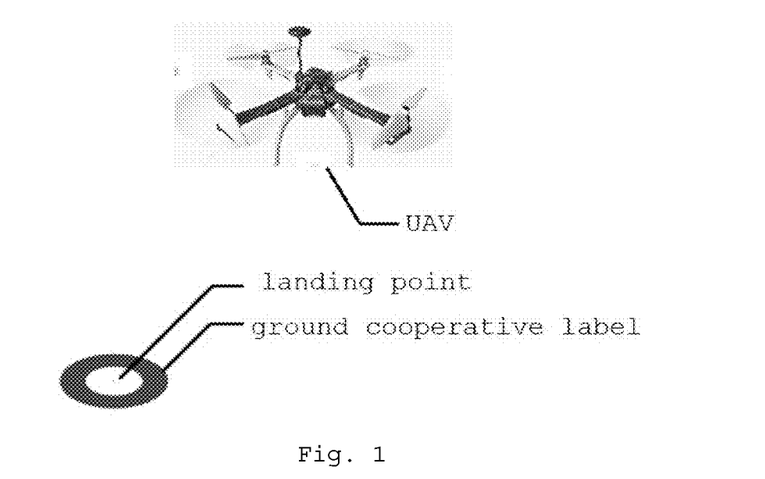
FIG. 1 shows a schematic diagram of a multi-rotor UAV and a ground cooperative label.

FIG. 1 shows a schematic diagram of a multi-rotor UAV and a ground cooperative label. The multi-rotor UAV has a camera fixed under the fuselage, and is equipped with an on-board processor. The UAV obtains center pixel position information of the ground cooperative label in a camera image and adjusts an appropriate control law to control the UAV to land smoothly. This disclosure does not have too many restrictions on the ground cooperative label. The ground cooperative label can be designed as, for example, a circle, rectangle, or a diamond pattern or a combination of some patterns, so long as it can be identified easily. The concept of the cooperative label can be generalized, such as a flat grass or a car roof. FIG. 1 shows an exemplary double-circle cooperative label. Features of the cooperative label can be uploaded via ground station software for extracting these features during image processing.

During the landing process, the UAV can first fly to a landing area by means of GPS and inertial combined navigation, so that the cooperative label is in the field of view of the camera (the camera is fixed directly below the fuselage and perpendicular to the ground). For a UAV flying at 80 to 100 meters, the camera's field of view is sufficient to cover the cooperative label. Since GPS navigation has an error of 3 meters to 5 meters, it cannot meet the requirements of centimeter level positioning, so a visual servo control method is used to improve the landing accuracy.

Figure 2:
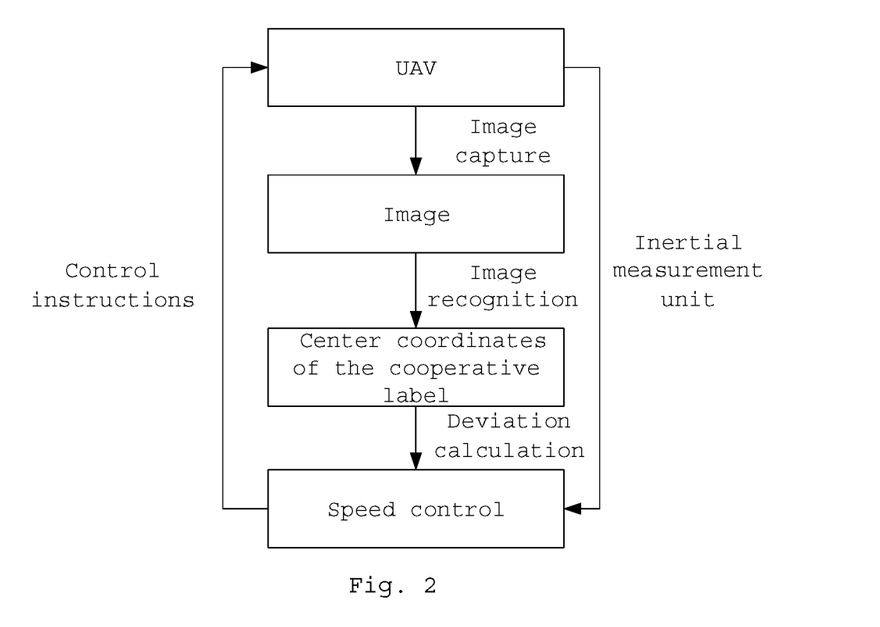
FIG. 2 shows a schematic flowchart of autonomous landing of a UAV according to some embodiments of the present disclosure.

The camera collects image information in real time and sends it to the on-board processor. The on-board processor identifies a center pixel of the cooperative label, which is taken as the landing point of the UAV. At the same time, a vertical mapping point of the camera's optical center on the ground is taken as the vertical mapping point of the UAV on the ground, and the vertical mapping point of the UAV on the ground coincides with a point on the ground indicated by the center position of the camera's image. According to a deviation between the vertical mapping point on the ground and a landing point of the UAV, that is, according to a deviation between the position of the center pixel of the cooperative label and the center position of the image plane, a speed control amount can be calculated and sent to a flight control unit, which controls the UAV to fly at the specified speed. FIG. 2 shows a schematic flowchart of autonomous landing of a UAV according to some embodiments of the present disclosure.

Figure 3:
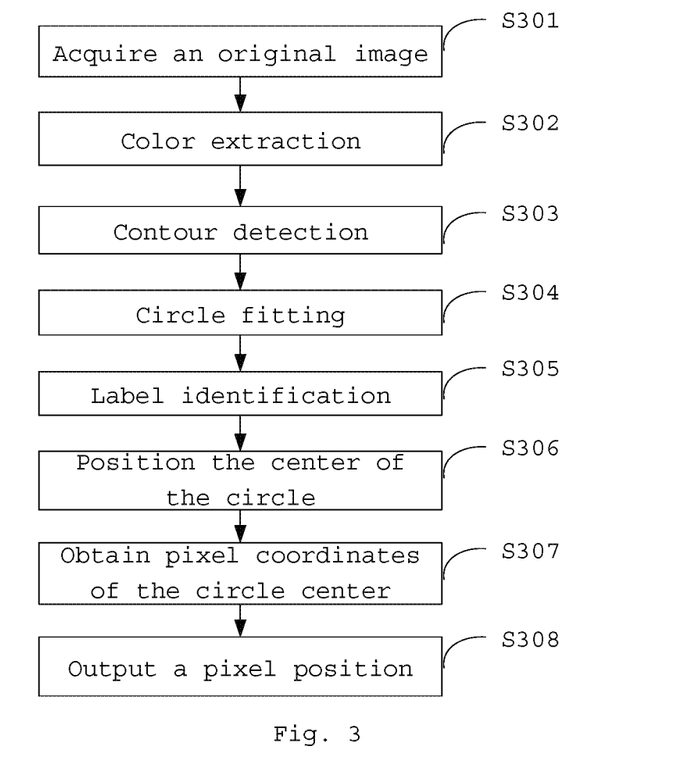
FIG. 3 shows a schematic flowchart of an image processing process according to some embodiments of the present disclosure.

FIG. 3 shows a schematic flowchart of an image processing process according to some embodiments of the present disclosure. As shown in FIG. 3, taking a circular ground cooperative label as an example, this embodiment comprises steps S301 to S308.

In step S301, the on-board processor acquires an original image including the ground cooperative label by the camera.

In step S302, the on-board processor performs color extraction on the original image.

In step S303, the on-board processor performs contour detection on the original image.

In step S304, the on-board processor performs circle fitting on the original image.

In step S305, the on-board processor identifies the label in the original image.

In step S306, the on-board processor positions the center of the circle.

In step S307, the on-board processor obtains a pixel coordinate of the circle center.

In step S308, the on-board processor outputs an output pixel position of the landing point.

The process of calculating a speed control amount according to the position of the center pixel and a center position deviation in the image plane will be described in detail below with reference to FIG. 4.

Figure 4:
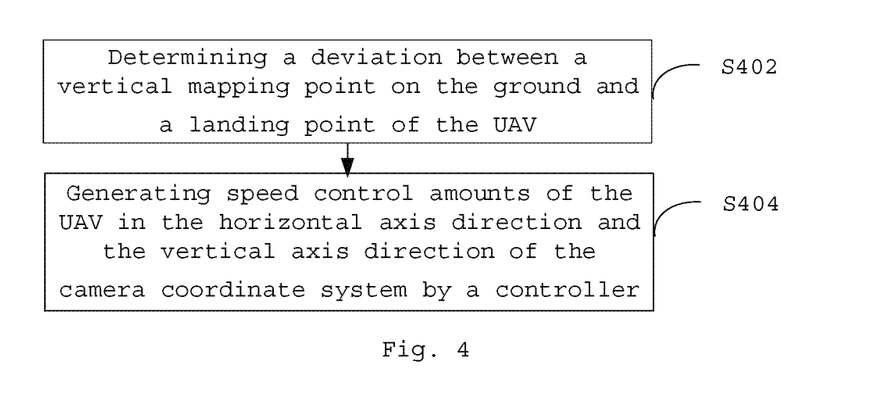
FIG. 4 shows a schematic flowchart of a control method of a UAV according to some embodiments of the present disclosure.

FIG. 4 shows a schematic flowchart of a control method of a UAV according to some embodiments of the present disclosure. As shown in FIG. 4, the control method of a UAV in this embodiment comprises steps S402 to S404.

Step S402: determining a deviation between a vertical mapping point on the ground and a landing point of the UAV, the deviation comprising a deviation in a horizontal axis direction of a camera coordinate system and a deviation in a vertical axis direction of the camera coordinate system.

In the camera coordinate system, the origin is the optical center of the camera, the horizontal axis and vertical axis of the camera coordinate system are respectively parallel to the horizontal axis and vertical axis of the captured image, and the longitudinal axis is the optical axis of the camera, which is perpendicular to the plane of the captured image. As shown in formula (1), an image coordinate system and a pixel coordinate system can be separately established on the captured image. The origin of the image coordinate system is located at the center of the image captured by the camera. The origin of the pixel coordinate system can be located at one of a plurality of vertices of the image captured by the camera (the top left vertex of the image in this embodiment, for example). The horizontal axis direction of the image coordinate system and the horizontal axis direction of the pixel coordinate system are the same as the horizontal axis direction of the camera coordinate system, and the vertical axis direction of the image coordinate system and the vertical axis direction of the pixel coordinate system are the same as the vertical axis direction of the camera coordinate system. Then, determine a deviation between the vertical mapping point and the landing point in the horizontal axis direction of the camera coordinate system and a deviation between the vertical mapping point and the landing point in the vertical axis direction of the camera coordinate system by using a vertical height of the UAV relative to the ground, coordinates of the landing point in a pixel coordinate system, an origin of the image coordinate system in the pixel coordinate system, and normalized focal lengths of the UAV camera in the horizontal axis and the vertical axis direction of the pixel coordinate system.

$$\begin{cases} x = z(u - u_0)/\alpha_x \\ y = z(v - v_0)/\alpha_y \end{cases} \quad (1)$$

where x represents a deviation between the vertical mapping point and the landing point in the horizontal axis direction of the camera coordinate system, y represents a deviation between the vertical mapping point and the landing point in the vertical axis direction of the camera coordinate system, and z represents a vertical height of the UAV relative to the ground, u represents an abscissa of the landing point in the pixel coordinate system, v represents an ordinate of the landing point in the pixel coordinate system, $u_0$ represents an abscissa of the origin of the image coordinate system in the pixel coordinate system, and $v_0$ represents an ordinate of the origin of the image coordinate system in the pixel coordinate system, $\alpha_x$ represents a normalized focal length of the UAV camera in the horizontal axis direction of the pixel coordinate system, and $\alpha_y$ represents a normalized focal length of the UAV camera in the vertical axis coordinate of the pixel coordinate system.

Step S404: generating speed control amounts of the UAV in the horizontal axis direction and the vertical axis direction of the camera coordinate system by a controller, using the deviation in the horizontal axis direction and the deviation in the vertical axis direction.

In some embodiments, a proportional-integral-differential (PID) controller can be adopted to generating a speed control amount of the UAV in the horizontal axis direction of the camera coordinate system and a speed control amount of the UAV in the vertical axis direction of the camera coordinate system using the following formula (2):

$$\begin{cases} U_x(t) = P_x x(t) + I_x \left[ x(t) + \ldots + x(0) \right] + D_x [x(t) - x(t-1)] \\ U_y(t) = P_y y(t) + I_y \left[ y(t) + \ldots + y(0) \right] + D_y [y(t) - y(t-1)] \end{cases} \quad (2)$$

where $u_x(t)$ represents a speed control amount of the UAV in the horizontal axis direction of the camera coordinate system at time t, $u_y(t)$ represents a speed control amount of the UAV in the vertical axis direction of the camera coordinate system at time t, $P_x$ represents a proportional control parameter of the PID controller in the horizontal axis direction of the camera coordinate system, $P_y$ represents a proportional control parameter of the PID controller in the vertical axis direction of the camera coordinate system, $I_x$ represents a differential control parameter of the PID controller in the horizontal axis direction of the camera coordinate system, $I_y$ represents a differential control parameter of the PID controller in the vertical axis direction of the camera coordinate system $D_x$ represents an integral control parameter of the PID controller in the horizontal axis direction of the camera coordinate system, and $D_y$ represents an integral control parameter of the PID controller in the vertical axis direction of the camera coordinate system, x(t) represents the deviation in the horizontal axis direction at time t, and y(t) represents the deviation in the vertical axis direction at time t.

The above embodiment implements an autonomous control method of a UAV based on image visual servo control. After the camera of the UAV recognizes the cooperative label located on the ground, it determine a pixel-level deviation between the vertical mapping point of on the ground and the landing point of the UAV using the center pixel position of the cooperative label in the image plane. Thus, a flight control amount is directly calculated to complete the autonomous landing process of the UAV. During the entire autonomous landing process, it is not necessary to calculate the spatial posture information of the UAV relative to the ground cooperative label, so it is a simpler and more efficient control method of a UAV compared to related technologies.

The inventor found that a deviation between the vertical mapping point and the landing point of the UAV in the horizontal axis direction of the image coordinate system and a deviation between the vertical mapping point and the landing point of the UAV in the vertical axis direction of the image coordinate system can be represented using a vertical height of the UAV relative to the ground, coordinates of the landing point of the UAV in the image coordinate system, the origin of the image coordinate system coordinates in the image coordinate system, and normalized focal lengths of the UAV camera in the horizontal axis and vertical axis directions of the image coordinate system. The derivation of formula (1) will be described in detail below.

Figure 5:
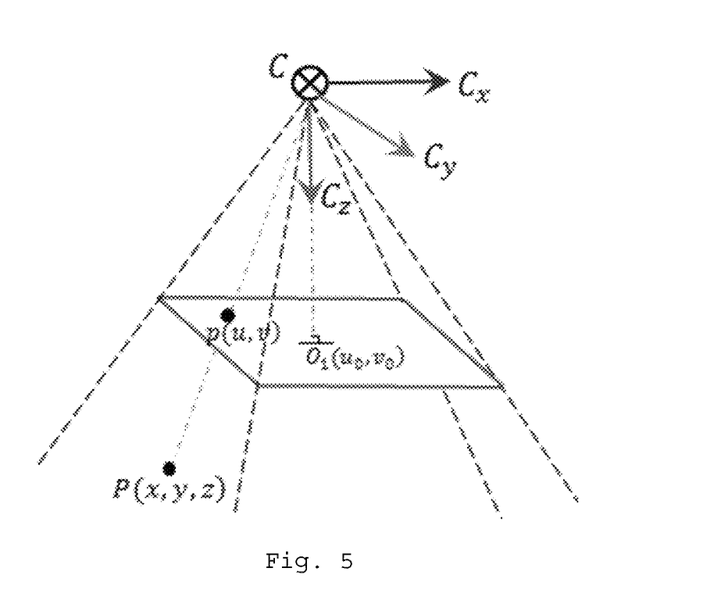
FIG. 5 shows a UAV camera projection model of the present disclosure.
Figure 6:
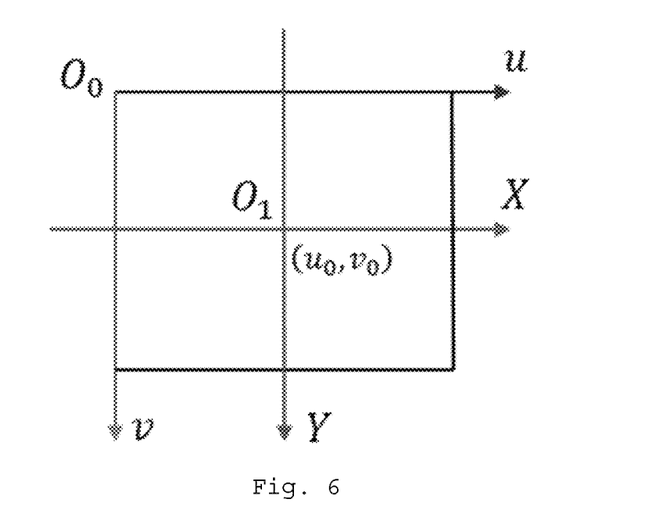
FIG. 6 shows a pixel coordinate system and an image coordinate system of the present disclosure.

FIG. 5 shows a UAV camera projection model. According to the camera projection model, an image coordinate system can be established. FIG. 6 shows a pixel coordinate system and an image coordinate system.

In the camera projection model, C represents the camera coordinate system, and the spatial position of the landing point P is (x,y,z). (u, v) is the projection position of the point P in the image, and $(u_0, v_0)$ is the center of the image plane. $(u_0 o v)$ is the pixel coordinate system, $(XO_1Y)$ is the image coordinate system. The rectangle in FIG. 6 is an image taken by the camera. The physical size of each pixel is dX*dY. The relationship between coordinates of any pixel in the two coordinate systems satisfies formula (3):

$$\begin{cases} u = X/dX + u_0 \\ v = Y/dY + v_0 \end{cases} \quad (3)$$

An formula (4) can be obtained by transforming formula (3) into a matrix form, thereby determining a correspondence between coordinates in the pixel coordinate system and coordinates in the image coordinate system:

$$\begin{bmatrix} X \\ Y \\ 1 \end{bmatrix} = \begin{bmatrix} dX & 0 & -u_0 dX \\ 0 & dY & -v_0 dY \\ 0 & 0 & 1 \end{bmatrix} \begin{bmatrix} u \\ v \\ 1 \end{bmatrix} \quad (4)$$

Figure 7:
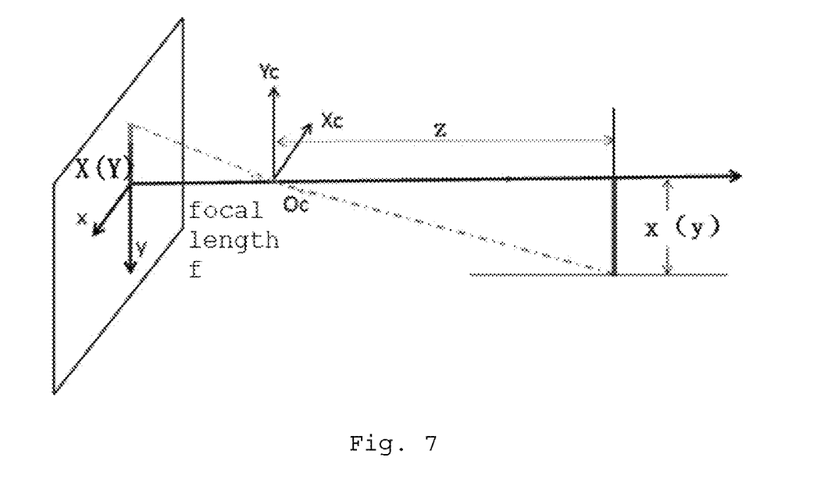
FIG. 7 shows a schematic diagram of the imaging principle of the camera.

FIG. 7 shows a schematic diagram of the imaging principle of the camera. A correspondence between coordinates in the image coordinate system and coordinates in the camera coordinate system can be determined according to the imaging principle of the camera:

$$\begin{cases} X = fx/z \\ Y = fy/z \end{cases} \quad (5)$$

The matrix formula after transformation is shown by formula (6), wherein s is a scale factor.

$$s \begin{bmatrix} X \\ Y \\ 1 \end{bmatrix} = \begin{bmatrix} f & 0 & 0 \\ 0 & f & 0 \\ 0 & 0 & 1 \end{bmatrix} \begin{bmatrix} x \\ y \\ z \end{bmatrix} \quad (6)$$

Then, a correspondence between the coordinates in the pixel coordinate system and the coordinates in the camera coordinate system is determined according to formula (4) and formula (6), and a deviation between the vertical mapping point and the landing point of the UAV in the horizontal axis direction of the camera coordinate system and a deviation between the vertical mapping point and the landing point of the UAV in the vertical axis direction of the camera coordinate system are determined using this correspondence, i.e., formula (7) is obtained.

$$s \begin{bmatrix} u \\ v \\ 1 \end{bmatrix} = \begin{bmatrix} 1/dX & 0 & u_0 \\ 0 & 1/dY & v_0 \\ 0 & 0 & 1 \end{bmatrix} \begin{bmatrix} f & 0 & 0 \\ 0 & f & 0 \\ 0 & 0 & 1 \end{bmatrix} \begin{bmatrix} x \\ y \\ z \end{bmatrix} = \begin{bmatrix} \alpha_x & 0 & u_0 \\ 0 & \alpha_y & v_0 \\ 0 & 0 & 1 \end{bmatrix} \begin{bmatrix} x \\ y \\ z \end{bmatrix} \quad (7)$$

Rearranging formula (7), formula (1) can be derived, where $\alpha_x = f/dX$, $\alpha_y = f/dY$ are the normalized focal lengths in the u and v directions, respectively. That is, the normalized focal length of the UAV camera in the horizontal axis direction of the pixel coordinate system is determined using a ratio of the focal length of the UAV camera to a size of each pixel in the horizontal axis direction; the normalized focal length of the UAV camera in the vertical axis direction of the pixel coordinate system is determined using a ratio of the focal length of the UAV camera to a size of each pixel in the vertical axis direction. $(\alpha_x, \alpha_y, u_0, v_0)$ is only related to the internal parameters of the camera, and can be obtained by camera calibration.

When formula (1) is used for landing control of the UAV, the height z of an arbitrary point P can be known by means of a height measurement sensor, and the controller is further designed to make x and y in formula (1) approach 0. Those skilled in the art should understand that two controllers in the X and Y directions can be coupled to each other by setting coupling factors a and b (for example, as shown in formula 8). Where a and b are constants between [0,1], respectively, and can be specifically determined according to the effect of simulations and tests.

$$\begin{cases} U_x(t) = P_x[x(t) + ay(t)] + I_x\left[x(t) + \ldots + x(0)\right] + D_x[x(t) - x(t-1)] \\ U_y(t) = P_y[y(t) + bx(t)] + I_y\left[y(t) + \ldots + y(0)\right] + D_y[y(t) - y(t-1)] \end{cases} \quad (8)$$

A control device of a UAV according to some embodiments of the present disclosure will be described with reference to FIG. 8 below.

Figure 8:
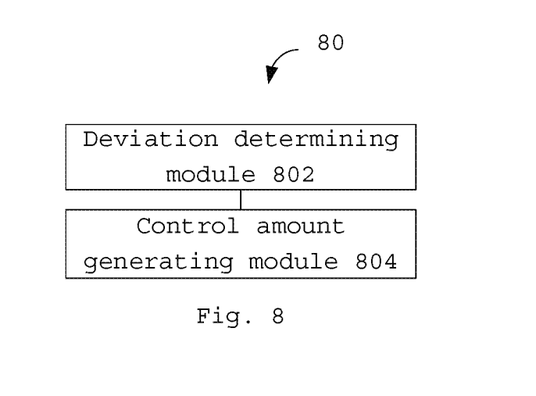
FIG. 8 shows a schematic structural diagram of a control device of a UAV according to some embodiments of the present disclosure.

FIG. 8 shows a schematic structural diagram of a control device of a UAV according to some embodiments of the present disclosure. As shown in FIG. 8, the control devices of a UAV 80 of these embodiments comprise modules 802-804.

A deviation determining module 802 is used for determining a deviation between a vertical mapping point on the ground and a landing point of the UAV, the deviation comprising a deviation in a horizontal axis direction of a camera coordinate system and a deviation in a vertical axis direction of the camera coordinate system.

A control amount generating module 804 is used for generating speed control amounts of the UAV in the horizontal axis direction and the vertical axis direction of the camera coordinate system by a controller, using the deviation in the horizontal axis direction and the deviation in the vertical axis direction.

In some embodiments, the deviation determining module 802 is used for determining a deviation between the vertical mapping point and the landing point in the horizontal axis direction of the camera coordinate system and a deviation between the vertical mapping point and the landing point in the vertical axis direction of the camera coordinate system by using a vertical height of the UAV relative to the ground, coordinates of the landing point in a pixel coordinate system, an origin of the image coordinate system in the pixel coordinate system, and normalized focal lengths of the UAV camera in the horizontal axis and the vertical axis direction of the pixel coordinate system.

In some embodiments, the deviation determining module 802 is used for determining a correspondence between coordinates in the pixel coordinate system and coordinates in the image coordinate system; determining a correspondence between coordinates in the image coordinate system and coordinates in the camera coordinate system according to the imaging principle of the camera; and determining a correspondence between coordinates in the pixel coordinate system and coordinates in the camera coordinate system, and determining a deviation between the vertical mapping point and the landing point in the horizontal axis direction of the camera coordinate system and a deviation between the vertical mapping point and the landing point in the vertical axis direction of the camera coordinate system using this correspondence.

In some embodiments, the deviation determining module 802 is used for determining a deviation between the vertical mapping point and the landing point in the horizontal axis direction of the camera coordinate system and a deviation between the vertical mapping point and the landing point in the vertical axis direction of the camera coordinate system using the following formula:

$$\begin{cases} x = z(u - u_0)/\alpha_x \\ y = z(v - v_0)/\alpha_y \end{cases}$$

where x represents a deviation between the vertical mapping point and the landing point in the horizontal axis direction of the camera coordinate system, y represents a deviation between the vertical mapping point and the landing point in the vertical axis direction of the camera coordinate system, and z represents a vertical height of the UAV relative to the ground, u represents an abscissa of the landing point in the pixel coordinate system, v represents an ordinate of the landing point in the pixel coordinate system, $u_0$ represents an abscissa of the origin of the image coordinate system in the pixel coordinate system, and $v_0$ represents an ordinate of the origin of the image coordinate system in the pixel coordinate system, $\alpha_x$ represents a normalized focal length of the UAV camera in the horizontal axis direction of the pixel coordinate system, and $\alpha_y$ represents a normalized focal length of the UAV camera in the vertical axis coordinate of the pixel coordinate system.

In some embodiments, the deviation determining module 802 is used for determining the normalized focal length of the UAV camera in the horizontal axis direction of the pixel coordinate system using a ratio of the focal length of the UAV camera to a size of each pixel in the horizontal axis direction; and determining the normalized focal length of the UAV camera in the vertical axis direction of the pixel coordinate system using a ratio of the focal length of the UAV camera to a size of each pixel in the vertical axis direction.

In some embodiments, the control amount generating module 804 is used for: generating a speed control amount of the UAV in the horizontal axis direction of the camera coordinate system and a speed control amount of the UAV in the vertical axis direction of the camera coordinate system by a PID controller using the following formula:

$$\begin{cases} U_x(t) = P_x x(t) + I_x\Big[x(t) + \ldots + x(0)\Big] + D_x[x(t) - x(t-1)] \\ U_y(t) = P_y y(t) + I_y\Big[y(t) + \ldots + y(0)\Big] + D_y[y(t) - y(t-1)] \end{cases}$$

where $u_x(t)$ represents a speed control amount of the UAV in the horizontal axis direction of the camera coordinate system at time t, $u_y(t)$ represents a speed control amount of the UAV in the vertical axis direction of the camera coordinate system at time t, $P_x$ represents a proportional control parameter of the PID controller in the horizontal axis direction of the camera coordinate system, $P_y$ represents a proportional control parameter of the PID controller in the vertical axis direction of the camera coordinate system, $I_x$ represents a differential control parameter of the PID controller in the horizontal axis direction of the camera coordinate system, $I_y$ represents a differential control parameter of the PID controller in the vertical axis direction of the camera coordinate system $D_x$ represents an integral control parameter of the PID controller in the horizontal axis direction of the camera coordinate system, and $D_y$ represents an integral control parameter of the PID controller in the vertical axis direction of the camera coordinate system, x(t) represents the deviation in the horizontal axis direction at time t, and y(t) represents the deviation in the vertical axis direction at time t.

Figure 9:
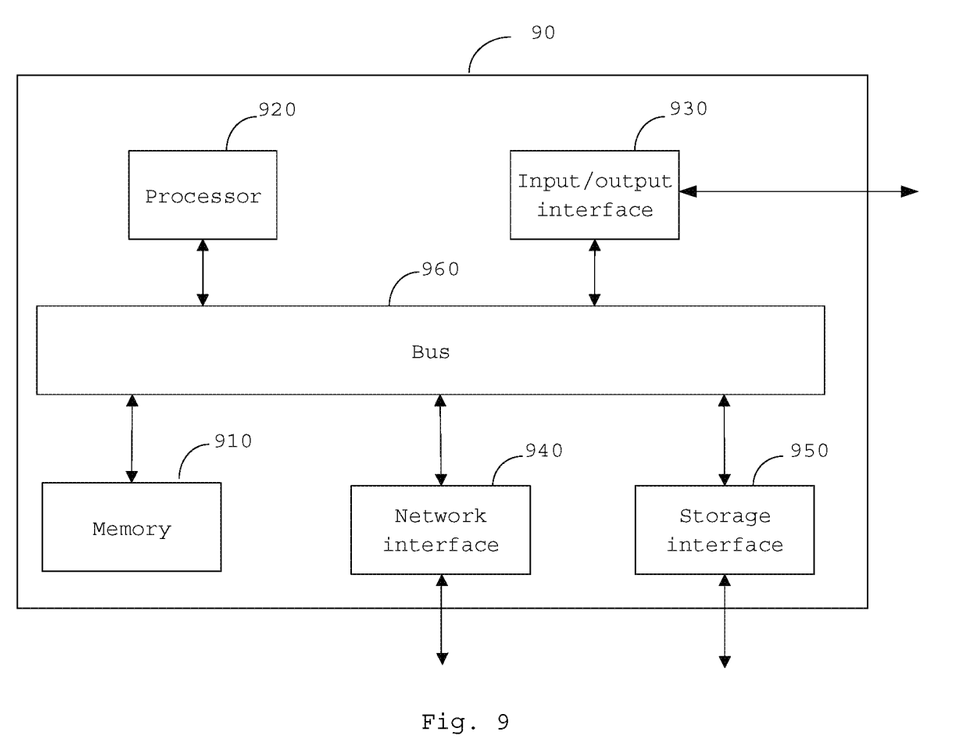
FIG. 9 shows a schematic structural diagram of a control device of a UAV according to other embodiments of the present disclosure.

FIG. 9 shows a schematic structural diagram of a control device of a UAV according to other embodiments of the present disclosure. As shown in FIG. 9, the control device of a UAV 90 of these embodiments comprise a memory 910 and a processor 920 coupled to the memory 910, which is configured to execute the control method of a UAV according to any one of the foregoing embodiments based on instructions stored in the memory.

Wherein, the memory 910 may comprise, for example, a system memory, a fixed non-volatile storage medium, or the like. The system memory stores, for example, an operation system, an application, a boot loader, and other programs.

The control device of a UAV 90 may further comprise an input/output interface 930, a network interface 940, a storage interface 950, and the like. These interfaces 930, 940, 950, as well as the memory 910 and the processor 920 may be connected, for example, via a bus 960, for example. The input/output interface 930 provides a connection interface for input/output devices such as a display, a mouse, a keyboard, and a touch screen. The network interface 940 provides a connection interface for various networked devices. The storage interface 950 provides a connection interface for external storage devices such as an SD card and a USB flash drive.

The present disclosure also comprises a computer readable storage medium having stored computer instructions thereon for the processor to perform the control method of a UAV in any one of the foregoing embodiments.

Those skilled in the art will appreciate that the embodiments of the present disclosure may be provided as a method, system, or computer program product. Therefore, the present disclosure may take the form of an entire hardware embodiment, an entire software embodiment, or a combination of software and hardware aspects. Moreover, the present disclosure may take the form of a computer program product embodied in one or more computer-usable non-transitory storage media (including but not limited to disk memory, CD-ROM, optical memory, and the like) containing computer usable program codes therein.

The present disclosure is described with reference to the flow charts and/or block diagrams of methods, devices (systems), and computer program products according to the embodiments of the present disclosure. It will be understood that each step and/or block of the flow charts and/or block diagrams as well as a combination of steps and/or blocks of the flow charts and/or block diagrams may be implemented by a computer program instruction. These computer program instructions may be provided to a processor of a general purpose computer, special purpose computer, an embedded processing machine, or other programmable data processing devices to produce a machine, such that the instructions executed by a processor of a computer or other programmable data processing devices produce a device for realizing a function designated in one or more steps of a flow chart and/or one or more blocks in a block diagram.

These computer program instructions may also be stored in a computer readable memory that can guide a computer or other programmable data processing device to operate in a particular manner, such that the instructions stored in the computer readable memory produce a manufacture including an instruction device. The instruction device realizes a function designated in one or more steps in a flow chart or one or more blocks in a block diagram.

These computer program instructions may also be loaded onto a computer or other programmable data processing devices, such that a series of operational steps are performed on a computer or other programmable device to produce a computer-implemented processing, such that the instructions executed on a computer or other programmable devices provide steps for realizing a function designated in one or more steps of the flow chart and/or one or more blocks in the block diagram.

The above descriptions are only the preferred embodiments of the present disclosure, but do not serve to limit the present disclosure. Any amendment, equivalent replacement, improvement, and the like made within the spirit and principles of the present disclosure should all be contained within the protection scope of the present disclosure.

What is claimed is:

1. A control method of an unmanned aerial vehicle (UAV), comprising:
    determining a deviation between a vertical mapping point on a ground and a landing point of the UAV in a horizontal axis direction of a camera coordinate system and a deviation between the vertical mapping point and the landing point in a vertical axis direction of the camera coordinate system by using a vertical height of the UAV relative to the ground, coordinates of the landing point in a pixel coordinate system, an origin of an image coordinate system in the pixel coordinate system, and normalized focal lengths of the UAV camera in the horizontal axis and the vertical axis direction of the pixel coordinate system; and
    generating speed control amounts of the UAV in the horizontal axis direction and the vertical axis direction of the camera coordinate system by a controller, using the deviation in the horizontal axis direction and the deviation in the vertical axis direction, comprising
        coupling a first controller in the horizontal axis direction to a second controller in the vertical axis direction by setting a first coupling factor and a second coupling factor;
        generating a speed control amount of the UAV in the horizontal axis direction of the camera coordinate system by the first controller, using the first coupling factor, the deviation in the horizontal axis direction, and the deviation in the vertical axis direction; and
        generating a speed control amount of the UAV in the vertical axis direction of the camera coordinate system by the second controller, using the second coupling factor, the deviation in the horizontal axis direction, and the deviation in the vertical axis direction.

2. The control method of a UAV according to claim 1, wherein determining a deviation between the vertical mapping point and the landing point in the horizontal axis direction of the camera coordinate system and a deviation between the vertical mapping point and the landing point in the vertical axis direction of the camera coordinate system comprises:
    determining a correspondence between coordinates in the pixel coordinate system and coordinates in the image coordinate system;
    determining a correspondence between coordinates in the image coordinate system and coordinates in the camera coordinate system; and
    determining a correspondence between coordinates in the pixel coordinate system and coordinates in the camera coordinate system, and determining a deviation between the vertical mapping point and the landing point in the horizontal axis direction of the camera coordinate system and a deviation between the vertical mapping point and the landing point in the vertical axis direction of the camera coordinate system using this correspondence.

3. The control method of a UAV according to claim 1, wherein a deviation between the vertical mapping point and the landing point in the horizontal axis direction of the camera coordinate system and a deviation between the vertical mapping point and the landing point in the vertical axis direction of the camera coordinate system are determined using the following formula:

$$\begin{cases} x = z(u - u_0)/\alpha_x \\ y = z(v - v_0)/\alpha_y \end{cases}$$

where x represents a deviation between the vertical mapping point and the landing point in the horizontal axis direction of the camera coordinate system, y represents a deviation between the vertical mapping point and the landing point in the vertical axis direction of the camera coordinate system, and z represents a vertical height of the UAV relative to the ground, u represents an abscissa of the landing point in the pixel coordinate system, v represents an ordinate of the landing point in the pixel coordinate system, $u_0$ represents an abscissa of the origin of the image coordinate system in the pixel coordinate system, and $v_0$ represents an ordinate of the origin of the image coordinate system in the pixel coordinate system, $\alpha_x$ represents a normalized focal length of the UAV camera in the horizontal axis direction of the pixel coordinate system, and $\alpha_y$ represents a normalized focal length of the UAV camera in the vertical axis coordinate of the pixel coordinate system.

4. The control method of a UAV according to claim 1, wherein:
    the normalized focal length of the UAV camera in the horizontal axis direction of the pixel coordinate system is determined using a ratio of the focal length of the UAV camera to a size of each pixel in the horizontal axis direction;
    the normalized focal length of the UAV camera in the vertical axis direction of the pixel coordinate system is determined using a ratio of the focal length of the UAV camera to a size of each pixel in the vertical axis direction.

5. The control method of a UAV according to claim 1, wherein the controller is a proportional-integral-differential (PID) controller, the PID controller generating a speed control amount of the UAV in the horizontal axis direction of the camera coordinate system and a speed control amount of the UAV in the vertical axis direction of the camera coordinate system using the following formula:

$$\begin{cases} U_x(t) = P_x x(t) + I_x \Big[ x(t) + \ldots + x(0) \Big] + D_x[x(t) - x(t-1)] \\ U_y(t) = P_y y(t) + I_y \Big[ y(t) + \ldots + y(0) \Big] + D_y[y(t) - y(t-1)] \end{cases}$$

where $u_x(t)$ represents a speed control amount of the UAV in the horizontal axis direction of the camera coordinate system at time t, $u_y(t)$ represents a speed control amount of the UAV in the vertical axis direction of the camera coordinate system at time t, $P_x$ represents a proportional control parameter of the PID controller in the horizontal axis direction of the camera coordinate system, $P_y$ represents a proportional control parameter of the PID controller in the vertical axis direction of the camera coordinate system, $I_x$ represents an integral control parameter of the PID controller in the horizontal axis direction of the camera coordinate system, $I_y$ represents an integral control parameter of the PID controller in the vertical axis direction of the camera coordinate system $D_x$ represents differential control parameter of the PID controller in the horizontal axis direction of the camera coordinate system, and $D_y$ represents a differential control parameter of the PID controller in the vertical axis direction of the camera coordinate system, x(t) represents the deviation in the horizontal axis direction at time t, and y(t) represents the deviation in the vertical axis direction at time t.

6. A control device of a UAV, comprising:
a processor; and
a memory coupled to the processor and storing instructions that when executed by the processor, cause the processor to:
determine a deviation between a vertical mapping point on a ground and a landing point of the UAV in a horizontal axis direction of a camera coordinate system and a deviation between the vertical mapping point and the landing point in a vertical axis direction of the camera coordinate system by using a vertical height of the UAV relative to the ground, coordinates of the landing point in a pixel coordinate system, an origin of an image coordinate system in the pixel coordinate system, and normalized focal lengths of the UAV camera in the horizontal axis and the vertical axis direction of the pixel coordinate system; and
generate speed control amounts of the UAV in the horizontal axis direction and the vertical axis direction of the camera coordinate system by a controller, using the deviation in the horizontal axis direction and the deviation in the vertical axis direction, comprising
couple a first controller in the horizontal axis direction to a second controller in the vertical axis direction by setting a first coupling factor and a second coupling factor;
generate a speed control amount of the UAV in the horizontal axis direction of the camera coordinate system by the first controller, using the first coupling factor, the deviation in the horizontal axis direction, and the deviation in the vertical axis direction; and
generate a speed control amount of the UAV in the vertical axis direction of the camera coordinate system by the second controller, using the second coupling factor, the deviation in the horizontal axis direction, and the deviation in the vertical axis direction.

7. The control device of a UAV according to claim 6, wherein determining a deviation between the vertical mapping point and the landing point in the horizontal axis direction of the camera coordinate system and a deviation between the vertical mapping point and the landing point in the vertical axis direction of the camera coordinate system comprises:
determining a correspondence between coordinates in the pixel coordinate system and coordinates in the image coordinate system;
determining a correspondence between coordinates in the image coordinate system and coordinates in the camera coordinate system; and
determining a correspondence between coordinates in the pixel coordinate system and coordinates in the camera coordinate system, and determining a deviation between the vertical mapping point and the landing point in the horizontal axis direction of the camera coordinate system and a deviation between the vertical mapping point and the landing point in the vertical axis direction of the camera coordinate system using this correspondence.

8. The control device of a UAV according to claim 6, wherein a deviation between the vertical mapping point and the landing point in the horizontal axis direction of the camera coordinate system and a deviation between the vertical mapping point and the landing point in the vertical axis direction of the camera coordinate system are determined using the following formula:

$$\begin{cases} x = z(u - u_0)/\alpha_x \\ y = z(v - v_0)/\alpha_y \end{cases}$$

where x represents a deviation between the vertical mapping point and the landing point in the horizontal axis direction of the camera coordinate system, y represents a deviation between the vertical mapping point and the landing point in the vertical axis direction of the camera coordinate system, and z represents a vertical height of the UAV relative to the ground, u represents an abscissa of the landing point in the pixel coordinate system, v represents an ordinate of the landing point in the pixel coordinate system, $u_0$ represents an abscissa of the origin of the image coordinate system in the pixel coordinate system, and $v_0$ represents an ordinate of the origin of the image coordinate system in the pixel coordinate system, $\alpha_x$ represents a normalized focal length of the UAV camera in the horizontal axis direction of the pixel coordinate system, and $\alpha_y$ represents a normalized focal length of the UAV camera in the vertical axis coordinate of the pixel coordinate system.

9. The control device of a UAV according to claim 6, wherein:
the normalized focal length of the UAV camera in the horizontal axis direction of the pixel coordinate system is determined using a ratio of the focal length of the UAV camera to a size of each pixel in the horizontal axis direction;
the normalized focal length of the UAV camera in the vertical axis direction of the pixel coordinate system is determined using a ratio of the focal length of the UAV camera to a size of each pixel in the vertical axis direction.

10. The control device of a UAV according to claim 6, wherein the controller is a proportional-integral-differential (PID) controller, the PID controller generating a speed control amount of the UAV in the horizontal axis direction of the camera coordinate system and a speed control amount of the UAV in the vertical axis direction of the camera coordinate system using the following formula:

$$\begin{cases} U_x(t) = P_x x(t) + I_x\left[x(t) + \ldots + x(0)\right] + D_x[x(t) - x(t-1)] \\ U_y(t) = P_y y(t) + I_y\left[y(t) + \ldots + y(0)\right] + D_y[y(t) - y(t-1)] \end{cases}$$

where $u_x(t)$ represents a speed control amount of the UAV in the horizontal axis direction of the camera coordinate system at time t, $u_y(t)$ represents a speed control amount of the UAV in the vertical axis direction of the camera coordinate system at time t, $P_x$ represents a proportional control parameter of the PID controller in the horizontal axis direction of the camera coordinate system, $P_y$ represents a proportional control parameter of the PID controller in the vertical axis direction of the camera coordinate system, $I_x$ represents an integral control parameter of the PID controller in the horizontal axis direction of the camera coordinate system, $I_y$ represents an integral control parameter of the PID controller in the vertical axis direction of the camera coordinate system $D_x$ represents a differential control parameter of the PID controller in the horizontal axis direction of the camera coordinate system, and $D_y$ represents a differential control parameter of the PID controller in the vertical axis direction of the camera coordinate system, x(t) represents the deviation in the horizontal axis direction at time t, and y(t) represents the deviation in the vertical axis direction at time t.

11. A non-transitory computer-readable storage medium storing computer instructions which, when executed by a processor, cause a processor to:
determine a deviation between a vertical mapping point on a ground and a landing point of the UAV in a horizontal axis direction of a camera coordinate system and a deviation between the vertical mapping point and the landing point in a vertical axis direction of the camera coordinate system by using a vertical height of the UAV relative to the ground, coordinates of the landing point in a pixel coordinate system, an origin of an image coordinate system in the pixel coordinate system, and normalized focal lengths of the UAV camera in the horizontal axis and the vertical axis direction of the pixel coordinate system; and
generate speed control amounts of the UAV in the horizontal axis direction and the vertical axis direction of the camera coordinate system by a controller, using the deviation in the horizontal axis direction and the deviation in the vertical axis direction, comprising
couple a first controller in the horizontal axis direction to a second controller in the vertical axis direction by setting a first coupling factor and a second coupling factor;
generate a speed control amount of the UAV in the horizontal axis direction of the camera coordinate system by the first controller, using the first coupling factor, the deviation in the horizontal axis direction, and the deviation in the vertical axis direction; and
generate a speed control amount of the UAV in the vertical axis direction of the camera coordinate system by the second controller, using the second coupling factor, the deviation in the horizontal axis direction, and the deviation in the vertical axis direction.

12. The non-transitory computer readable storage medium according to claim 11, wherein the processor determines a deviation between the vertical mapping point and the landing point in the horizontal axis direction of the camera coordinate system and a deviation between the vertical mapping point and the landing point in the vertical axis direction of the camera coordinate system by using a vertical height of the UAV relative to the ground, coordinates of the landing point in a pixel coordinate system, an origin of the image coordinate system in the pixel coordinate system, and normalized focal lengths of the UAV camera in the horizontal axis and the vertical axis direction of the pixel coordinate system.

13. The non-transitory computer readable storage medium according to claim 11, wherein a deviation between the vertical mapping point and the landing point in the horizontal axis direction of the camera coordinate system and a deviation between the vertical mapping point and the landing point in the vertical axis direction of the camera coordinate system are determined using the following formula:

$$\begin{cases} x = z(u - u_0)/\alpha_x \\ y = z(v - v_0)/\alpha_y \end{cases}$$

where x represents a deviation between the vertical mapping point and the landing point in the horizontal axis direction of the camera coordinate system, y represents a deviation between the vertical mapping point and the landing point in the vertical axis direction of the camera coordinate system, and z represents a vertical height of the UAV relative to the ground, u represents an abscissa of the landing point in the pixel coordinate system, v represents an ordinate of the landing point in the pixel coordinate system, $u_0$ represents an abscissa of the origin of the image coordinate system in the pixel coordinate system, and $v_0$ represents an ordinate of the origin of the image coordinate system in the pixel coordinate system, $\alpha_x$ represents a normalized focal length of the UAV camera in the horizontal axis direction of the pixel coordinate system, and $\alpha_y$ represents a normalized focal length of the UAV camera in the vertical axis coordinate of the pixel coordinate system.

14. The non-transitory computer readable storage medium according to claim 11, wherein:
the normalized focal length of the UAV camera in the horizontal axis direction of the pixel coordinate system is determined using a ratio of the focal length of the UAV camera to a size of each pixel in the horizontal axis direction;
the normalized focal length of the UAV camera in the vertical axis direction of the pixel coordinate system is determined using a ratio of the focal length of the UAV camera to a size of each pixel in the vertical axis direction.

15. The non-transitory computer readable storage medium according to claim 11, wherein the controller is a proportional-integral-differential (PID) controller, the PID controller generating a speed control amount of the UAV in the horizontal axis direction of the camera coordinate system and a speed control amount of the UAV in the vertical axis direction of the camera coordinate system using the following formula:

$$\begin{cases} U_x(t) = P_x x(t) + I_x\left[x(t) + \ldots + x(0)\right] + D_x[x(t) - x(t-1)] \\ U_y(t) = P_y y(t) + I_y\left[y(t) + \ldots + y(0)\right] + D_y[y(t) - y(t-1)] \end{cases}$$

where $u_x(t)$ represents a speed control amount of the UAV in the horizontal axis direction of the camera coordinate system at time t, $u_y(t)$ represents a speed control amount of the UAV in the vertical axis direction of the camera coordinate system at time t, $P_x$ represents a proportional control parameter of the PID controller in the horizontal axis direction of the camera coordinate system, $P_y$ represents a proportional control parameter of the PID controller in the vertical axis direction of the camera coordinate system, $I_x$ represents an integral control parameter of the PID controller in the horizontal axis direction of the camera coordinate system, $I_y$ represents an integral control parameter of the PID controller in the vertical axis direction of the camera coordinate system $D_x$ represents a differential control parameter of the PID controller in the horizontal axis direction of the camera coordinate system, and $D_y$ represents a differential control parameter of the PID controller in the vertical axis direction of the camera coordinate system, x(t) represents the deviation in the horizontal axis direction at time t, and y(t) represents the deviation in the vertical axis direction at time t.

* * * * *